United States Patent
Ranganath (10) Patent No.: US 7,425,726 B2
(45) Date of Patent: Sep. 16, 2008

(54) ELECTROABSORPTION MODULATORS AND METHODS OF MAKING THE SAME

(75) Inventor: Tirumala R. Ranganath, Palo Alto, CA (US)

(73) Assignee: Avago Technologies Fiber IP Pte Ltd., Singapore (SG)

( * ) Notice: Subject to any disclaimer, the term of this patent is extended or adjusted under 35 U.S.C. 154(b) by 394 days.

(21) Appl. No.: 10/848,870

(22) Filed: May 19, 2004

(65) Prior Publication Data

US 2005/0258430 A1    Nov. 24, 2005

(51) Int. Cl.
*H01L 27/15* (2006.01)
*H01L 29/26* (2006.01)
*H01L 31/12* (2006.01)
*H01L 33/00* (2006.01)

(52) U.S. Cl. .............................. 257/79; 372/50; 372/92; 372/98; 372/99

(58) Field of Classification Search .................. 257/96, 257/106, 97, 80–84, 25, 104; 372/50, 46, 372/44, 43.01–44.01, 92, 98–99
See application file for complete search history.

(56) References Cited

U.S. PATENT DOCUMENTS

| | | | | |
|---|---|---|---|---|
| 4,831,630 | A * | 5/1989 | Scifres et al. | 372/50.123 |
| 4,915,482 | A | 4/1990 | Collins et al. | |
| 5,366,927 | A | 11/1994 | Schetzina | |
| 5,548,607 | A | 8/1996 | Tsang | |
| 5,789,765 | A * | 8/1998 | Nishikata et al. | 257/86 |
| 5,936,266 | A * | 8/1999 | Holonyak et al. | 257/106 |
| 6,044,097 | A | 3/2000 | Kawamura et al. | |
| 6,088,500 | A | 7/2000 | Zmudzinski et al. | |
| 6,472,682 | B1 | 10/2002 | Kuramoto | |
| 2002/0097941 | A1 | 7/2002 | Forrest et al. | |
| 2002/0101898 | A1 * | 8/2002 | Lo et al. | 372/46 |
| 2002/0195609 | A1 * | 12/2002 | Yoshitake et al. | 257/81 |
| 2004/0070810 | A1 | 4/2004 | Yu et al. | |
| 2004/0084683 | A1 * | 5/2004 | Suzuki | 257/84 |
| 2005/0105576 | A1 * | 5/2005 | Kim | 372/44 |

FOREIGN PATENT DOCUMENTS

| | | |
|---|---|---|
| EP | 0 599 826 A1 | 6/1994 |
| EP | 1 320 158 A1 | 6/2003 |

OTHER PUBLICATIONS

Wang et al., He+ -implanted InxGa1-xAsyP1-y ($\lambda g$= 1.3 μm) Tunnel Junctions and Their Application as Current Blocking Layers, IEEE LEOS Conference, pp. 630-631 (2001).*

(Continued)

*Primary Examiner*—Steven Loke
*Assistant Examiner*—Tram H Nguyen (57) ABSTRACT

Electro-absorption modulators and methods of making the same are described. In one aspect, an electroabsorption modulator includes first and second electrodes, first and second cladding regions, an active region, and a tunnel junction structure. The first and second cladding regions are between the first and second electrodes. The active region is between the first and second cladding regions and includes a light absorption region. The tunnel junction structure is between the active region and one of the first and second cladding regions.

2 Claims, 5 Drawing Sheets

OTHER PUBLICATIONS

Willen, Bo et al. "Development of Components and Integration Techniques for High-Speed InP-based OEIC" 1999 Symposium on High Performance Electron Device . . . , Nov. 22, 1999, pp. 1-8.

Yamada, K. et al., "Characterization and Application of Triode-Type EA Modulator" Journal of Lightwave Technology, IEEE, vol. 17, No. 6, Jun. 1999, pp. 1079-1086.

R. Lewen et al., "Ultra high-speed segmented traveling-wave electroabsorption modulators," OFC 2003, post deadline paper PD38-1-PD38-3, Mar. 2003.

Wang and Forrest, He+ -implanted $InxGa1-xAsyP1-y$ (lambda(g)= 1.3 micrometers) Tunnel Junctions and Their Application as Current Blocking Layers, IEEE LEOS Conference, pp. 630-631 (2001).

J.K. Kim et al., "Epitaxially-stacked multiple-active-region 1.55 micrometer lasers for increased differential efficiency," Applied Physics Letters, vol. 74, No. 22, pp. 3251-3253 (May 31, 1999).

Office Action from corresponding application No. EP 04 028 039.8.

* cited by examiner

ELECTROABSORPTION MODULATORS AND METHODS OF MAKING THE SAME

BACKGROUND

Two general approaches typically are used to modulate the intensity of light: direct modulation and external modulation.

In a direct modulation approach, a laser (e.g., a laser diode) is directly modulated by an information signal to generate a modulated laser output. The laser output power often is modulated directly by modulating the input drive current to the laser. The laser begins lasing when the drive current exceeds a threshold current level. Typically, the modulation range of input drive current that is applied to a directly modulated laser extends above and near the threshold current level.

In an external modulation approach, a modulator modulates the intensity of light generated by a continuous wave laser in accordance with an information signal. The modulator and laser may be disposed on separate, discrete substrates or they may be fabricated together on a single substrate. External modulators fall into two main families: electro-optic type modulators, such as Mach-Zehnder type electro-optic modulators, which modulate light through destructive interference; and electro-absorption modulators, which modulate light by absorption (e.g., through the Quantum Confined Stark effect).

The absorption depth (i.e., the extinction ratio) and the spectrum of an electro-absorption modulator depend on the drive voltage across the modulator. An external modulator typically is positioned to receive the output of a continuous wave laser and the voltage across the modulator is varied to produce a digital optical bit stream.

In an external optical modulator, a time-varying electric signal modulates the input optical signal. Lumped-type (e.g., electro-absorptive) external optical modulators typically are limited at high frequencies by their total capacitance. Typical high-speed external optical modulators avoid such a limitation by using a traveling-wave electrode structure, which includes a transmission line signal electrode located near an optical waveguide carrying the input optical signal. In a traveling wave optical modulator, the optical modulation is dominated by the distributed interaction between the time-varying input electrical signal and an optical signal over the length of the optical modulator. Ideally, the input electrical signal and the input optical signal propagate with substantially the same phase velocities through a traveling wave optical modulator so that each portion of the optical signal interacts with substantially the same portion of the applied electrical signal as it propagates through the modulator.

In addition to matching optical and electrical phase velocities, it is desirable to reduce electrical losses as the input electrical signal travels through a traveling wave optical modulator. The characteristic impedance of the optical modulator typically is matched to the impedance of the source of the input electrical signal to reduce reflections and increase the electrical voltage delivered across the optical modulator. The geometry of the signal electrode as well as the structure of the active semiconductor layer may be tailored to match optical and electric al phase velocities and also to match the characteristic impedance of the modulator. Typical electrode geometry parameters that are varied to achieve the desired electrical parameters include the thickness of the electrode, the width of the electrode, and the spacing between the top electrode and the side ground electrode (if present).

Existing electroabsorption modulators, however, have a number of inherent design constraints that prevent the electroabsorption modulators from being optimally designed for a wide range of velocity-matching and extinction ratio specifications.

SUMMARY

In one aspect, the invention features an electroabsorption modulator that includes first and second electrodes, first and second cladding regions, an active region, and a tunnel junction structure. The first and second cladding regions are between the first and second electrodes. The active region is between the first and second cladding regions and includes a light absorption region. The tunnel junction structure is between the active region and one of the first and second cladding regions.

In another aspect, the invention features a method of making the above-described electroabsorption modulator.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The electroabsorption modulator embodiment described in detail below leverages the hole current sinking capabilities and the depletion characteristics of a tunnel junction structure to enable the series resistance and the optical losses through the embodiment to be reduced. In this way, the incorporation of a tunnel junction structure into the electroabsorption modulator embodiment described below reduces several design constraints, allowing electroabsorption modulators to be designed for a wide range of velocity-matching and extinction ratio specifications.

Figures 1, 2A, 2B:
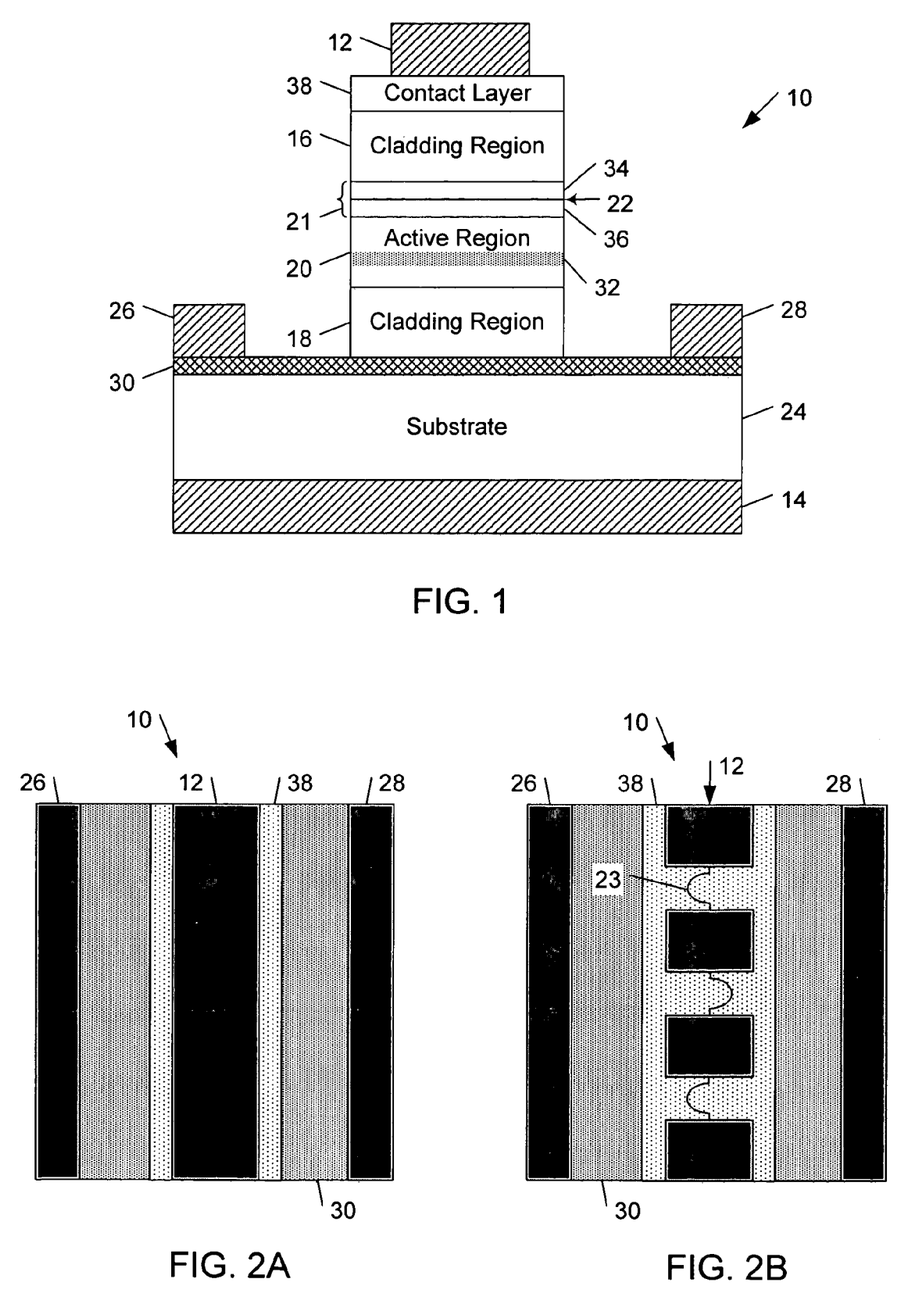
FIG. 1 is a diagrammatic cross-sectional view of an embodiment of an electroabsorption modulator.
FIG. 2A is a top view of an implementation of the electroabsorption modulator embodiment of FIG. 1 that has a signal electrode formed from a continuous strip of electrically conductive material.
FIG. 2B is a top view of an implementation of the electroabsorption modulator embodiment of FIG. 1 that has a signal electrode formed from multiple spaced-apart electrode segments of electrically conductive material that are connected in series by inter-stage microstrip lines.

FIG. 1 shows an embodiment of an electroabsorption modulator 10 that includes first and second electrodes 12, 14, first and second cladding regions 16, 18, an active region 20, and a tunnel junction structure 21 defining a tunnel junction 22.

The first and second electrodes 12, 14 include one or more metal layers. In one exemplary embodiment, each of the first and second electrodes 12, 14 includes an underlying layer of titanium, which promotes adhesion and forms an ohmic contact interface between the electrodes 12, 14 and the supporting semiconductor material, and an overlying layer of gold that forms electrical contacts for the electroabsorption modulator. In the illustrated embodiment, the first electrode 12 is a traveling-wave signal electrode formed from a continuous strip of electrically conductive material, as shown in FIG. 2A, or from multiple spaced-apart electrode segments of electrically conductive material that are connected in series, with each pair of signal electrode segments connected by a respective inter-stage microstrip line 23, as shown in FIG. 2B.

In some implementations, the first and second electrodes 12, 14 are connected to input and output bonding pads by respective microstrip lines. The input bonding pad is connected to an external signal source by a first bonding wire and the output bonding pad is connected to an external termination load through a second bonding wire. The electro-absorption modulator 10, the input and output bonding pads, and the input and output microstrip lines are fabricated on the same substrate 24 (e.g., a wafer of semiconductor material, such as InP or GaAs). The external signal source is any suitable high-frequency electrical signal source, including any RF (Radio Frequency) electrical signal source. The external termination load is any suitable termination load, such as a resistor. The termination load and the signal source typically are impedance-matched to reduce reflections and maximize the electrical voltage that can be delivered across the active region 20 of the electro-absorption modulator 10.

In the illustrated embodiment, the substrate 24 is electrically insulating and the electroabsorption modulator 10 and first and second metal film transmission lines 26, 28 are formed on an electrically conducting semiconductor layer 30 (e.g., n++InGaAs or n++InGaAsP), which is formed on the substrate 24. In other embodiments, the substrate 24 is electrically conducting, and the electroabsorption modulator 10 and the transmission lines 26, 28 are formed directly on the substrate 24.

Each of the first and second cladding regions 16, 18 and the active region 20 includes one or more semiconductor layers. In the illustrated embodiment, the first and second cladding regions 16, 18 are doped n-type and the active region is undoped and, therefore, contains relatively small amounts of impurities (e.g., less than about $5 \times 10^{15}$ cm$^{-3}$). The first and second cladding regions 16, 18 are formed of material compositions that have lower refractive indices than the material composition of the active region 20. In this way, the cladding regions 16, 18 and the active region 20 operate as a waveguide for light traveling through the electroabsorption modulator 10.

The active region 20 includes a light absorption region 32 that includes at least one quantum well with a conduction band alignment and a valence band alignment that create bound electron and hole states that are involved in the electro-absorption process. In other implementations, the light absorption region 32 of the active region 20 is formed of a bulk semiconductor layer instead of a quantum well structure, in which case light modulation is achieved through the Franz-Keldysh effect.

An n-type semiconductor layer 34 and a p-type semiconductor layer 36 forms the tunnel junction structure 21, where the tunnel junction 22 is defined at an interface between the layers 34, 36. The n-type layer 34 and the p-type layer 36 both are degenerately doped (i.e., the Fermi level is located within the allowed bands). In many semiconductor material systems, degenerate doping is achieved when the n-type layer 34 has a donor impurity concentration of at least about $10^{19}$ cm$^{-3}$ and the p-type layer 36 has a donor impurity concentration of at least about $10^{19}$ cm$^{-3}$. As explained in detail below, under typical operating conditions, the tunnel junction structure 21 formed by the n- and p-type layers 34, 36 sinks holes that are generated in the light absorption region 32 of the active region 20 through a process that involves electron tunneling from the n-type layer 34 to the p-type layer 36. In this process there is a relatively low voltage drop (e.g., on the order of millivolts under typical operating conditions) across the tunnel junction structure 21.

The hole sinking functionality of the tunnel junction structure 21 can be achieved using relatively thin n- and p-type layers 34, 36. The presence of the tunnel junction structure 21 allows the cladding region 16 to be formed of n-type material instead of p-type material, reducing the electrical resistance through the cladding region 16. This feature is particularly significant since free carrier absorption losses for p-type material are significantly higher than for n-type material. In addition, the lower conductivity p-type material limits the performance of the electroabsorption modulator 10 by reducing the voltage that can be applied across the active region 20 of the device and by increasing the microwave losses along the length of the modulator. The presence of the tunnel junction structure 21 increases the portion of the applied voltage that appears across the active region 20 and thereby increases the extinction ratio for a given applied voltage. The thickness of the active region 20 typically is limited by the need to achieve a specified extinction ratio and by issues of velocity matching. The use of the tunnel junction structure 21 therefore reduces the active region thickness design constraint, allowing greater freedom to tailor the active region thickness for velocity matching.

In addition, the presence of the tunnel junction structure 21 allows an n+-type contact layer 38 to be interposed between the n-type cladding region 16 and the signal electrode 12. The n+-type contact layer 38 facilitates the formation of an ohmic contact between the signal electrode 12 and the underlying semiconductor material. This feature is particularly significant in semiconductor material systems in which it is difficult to achieve low-resistance contacts to p-type conducting layers. In such situations, significant performance improvements may be realized by replacing the p-type conducting layer with an n-type conducting layer together with a tunnel junction. Thus, by incorporating the tunnel junction structure 21 into such a material system, a low-voltage drop contact with the signal electrode 12 may be created even when extremely heavy p-type doping is impossible and only moderate or light p-type doping levels may be achieved. The presence of the tunnel junction structure 21 therefore further increases the portion of the applied voltage that falls across the active region 20 and thereby increases the extinction ratio for a given applied voltage. In this way, the use of the tunnel junction structure 21 additionally reduces the active region thickness design constraint.

In some implementations, each of the first and second electrodes 12, 14 is formed of a gold layer overlying a titanium layer in contact with semiconductor material, the contact layer 38 is formed of an InGaAs layer that is degenerately doped n-type, each of the cladding regions 16, 18 and the substrate 24 is formed of n-type InP, the tunnel junction structure 21 is formed by degenerately doped n-and p-type InP layers 34, 36, and the active region 20 is formed of multiple layers of material selected from, for example, the AlGaInAs family of semiconductor materials or the InGaAsP family of semiconductor materials.

In other implementations, the tunnel junction structure 21 is formed by other pairs of n- and p-type binary, tertiary or quaternary materials. For example, in one implementation, the tunnel junction structure 21 is formed from a p-type AlInAs layer and an n-type InP layer. In general, the various layers of the electroabsorption modulator 10 may be formed from a wide variety of different semiconductor material systems, including AlInGaAs/InP, InGaAsP/InP, InGaAs/GaAs, AlGaAs/GaAs, and other II-V and II-VI semiconductor material systems.

Figure 3:
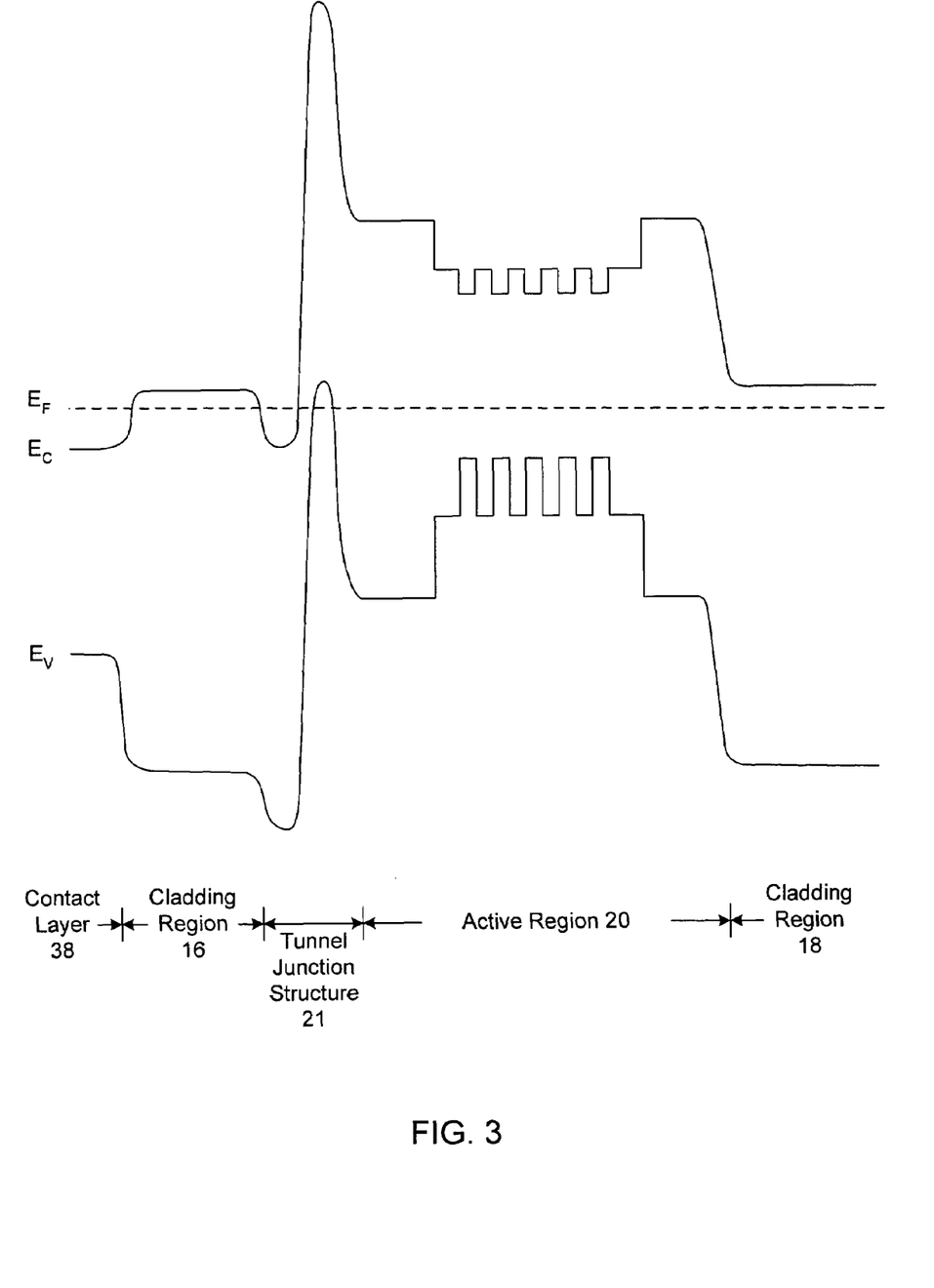
FIG. 3 is a diagrammatic energy band diagram of an exemplary implementation of the electroabsorption modulator embodiment of FIG. 1 in thermal equilibrium.
Figure 4:
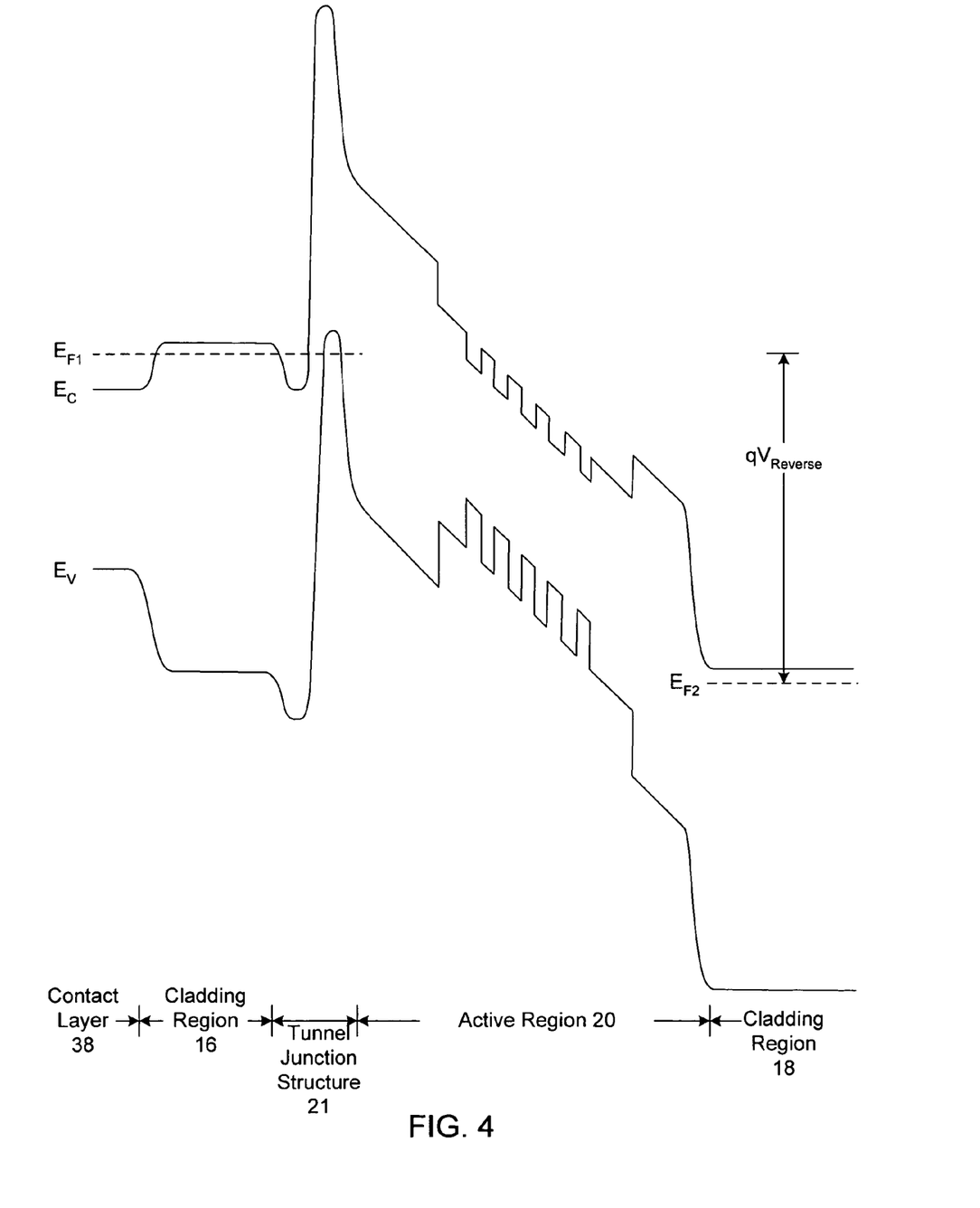
FIG. 4 is a diagrammatic energy band diagram of an exemplary implementation of the electroabsorption modulator embodiment of FIG. 1 under an applied reverse bias.

FIG. 3 shows a simplified energy band diagram for the semiconductor layers of one exemplary implementation of the electroabsorption modulator 10 in thermal equilibrium (zero applied bias). FIG. 4 shows a simplified energy band diagram for the semiconductor layers corresponding to the exemplary implementation of the electroabsorption modulator 10 shown in FIG. 3 with a reverse bias $V_{Reverse}$ applied across the first and second electrodes 12, 14.

In operation, a negative electrical potential typically is applied across the electroabsorption modulator 10, from the signal electrode 12 to the second electrode 14, to modulate the intensity of light traveling through the active region 20 by varying the optical absorption threshold in the active region 20. Under these conditions, the p-i-n junction formed by the p-type layer 36, the active region 20, and the n-type cladding region 18 is reverse biased and the tunnel junction structure 21 is forward biased. The p-type layer 36 operates as a sink for holes that are generated in the light absorption region 32 of the active region 20 as a result of light absorption.

Figure 5A:
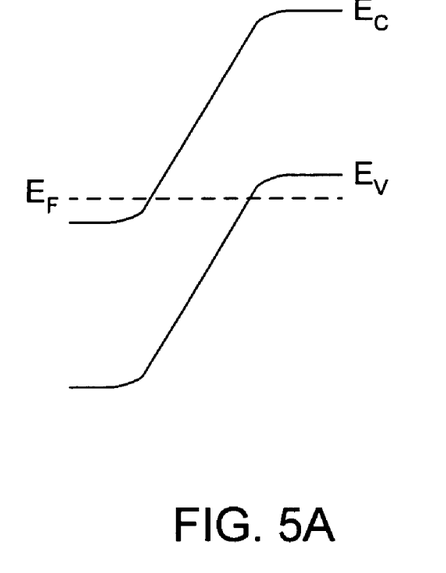
FIG. 5A is a diagrammatic energy band diagram of a tunnel junction structure in an exemplary implementation of the electroabsorption modulator embodiment of FIG. 1.
Figure 5B:
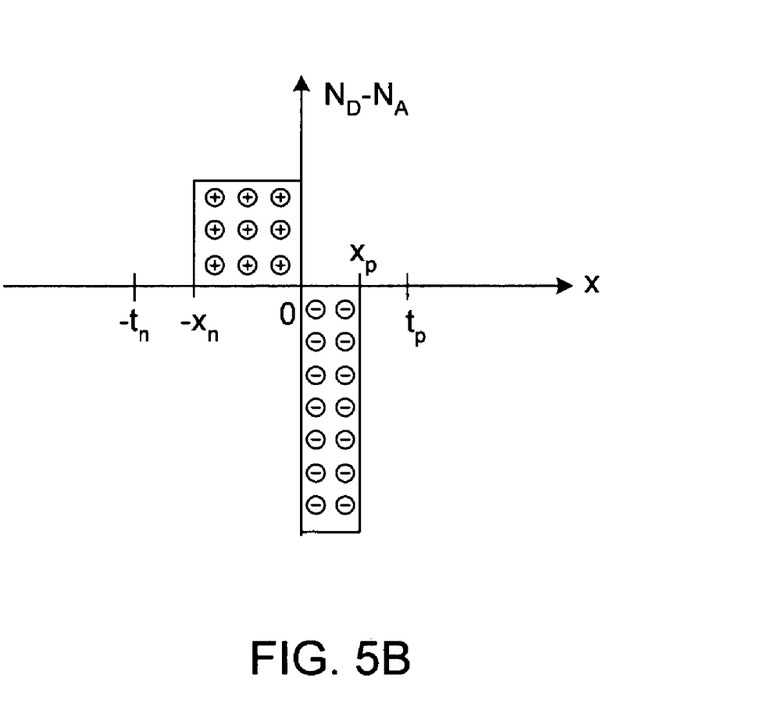
FIG. 5B is a plot of a space charge distribution in the exemplary tunnel junction structure corresponding to the energy band diagram of FIG. 5A.

FIGS. 5A and 5B respectively show a simplified energy band diagram and a simplified space charge distribution for the n- and p-type layers 34, 36 in thermal equilibrium. As shown in FIG. 5A, each of the n- and p-type layers 34, 36 is degenerately doped such that the Fermi level ($E_F$) is within the allowed energy bands. In some implementations of the electroabsorption modulator 10, the thicknesses $t_n$, $t_p$ are selected to be approximately the same magnitude as the depletion region widths $x_n$, $x_p$, respectively. In this way, the heavily doped n- and p-type layers 34, 36 are substantially depleted, minimizing the optical losses caused by free carriers in the n- and p-type layers 34, 36. In general, if the thicknesses of either the n- and p-type layers 34, 36 are thinner than the corresponding depletion widths $x_n$, $x_p$, then the differential resistance of the tunnel junction structure 21 tends to increase and a larger part of the applied voltage is dropped at the tunnel junction structure 21 instead of across the active region 20. If the thicknesses of either the n- and p-type layers 34, 36 are thicker than the corresponding depletion widths $x_n$, $x_p$, a larger fraction of the n- and p-type layers 34, 36 would be left undepleted. Since these undepleted regions are heavily doped, they would contribute to a significant free carrier absorption loss and, in the case of the undepleted portion of the p-type layer 36, also may give rise to extra inter-valence band absorption of the light to be modulated (i.e., the optical insertion loss increases).

For homojunctions, the depletion region widths $x_n$, $x_p$ may be computed as follows:

$$x_n = \sqrt{\frac{2\varepsilon_s}{q}\frac{N_A}{N_D}\frac{V_{Bi}}{(N_D + N_A)}} \quad (1)$$

$$x_p = \sqrt{\frac{2\varepsilon_s}{q}\frac{N_D}{N_A}\frac{V_{Bi}}{(N_D + N_A)}} \text{ where} \quad (2)$$

$$V_{Bi} = \frac{kT}{q}\ln\left(\frac{N_A N_D}{n_i^2}\right) \quad (3)$$

and $n_i$ is the intrinsic carrier density of the n- and p-type layers 34, 36, $\varepsilon_s$ is the permittivity of the n- and p-type layers 34, 36, q is the magnitude of electric charge in Coulombs, k is the Boltzmann constant, T is the absolute temperature in degrees Kelvin, $N_D$ is the donor doping level of the n-type layer 34, and $N_A$ is the acceptor doping level of the p-type layer 36.

In some implementations, the n-type layer has a thickness $t_n$ of at least about $0.9 \cdot x_n$ and less than about $2.0 \cdot x_n$, and the p-type layer has a thickness $t_p$ of at least about $0.9 \cdot x_p$ and less than about $2.0 \cdot x_p$. In some of these implementations, $x_n \leq t_n \leq 1.1 \cdot x_n$ and $x_p \leq t_p \leq 1.1 \cdot x_p$. In one exemplary implementation in which the p-type layer 36 is formed of InP with a doping density of $2 \times 10^{19}$ cm$^{-1}$ and the n-type layer 34 is formed of InP with a doping density of $1 \times 10^{19}$ cm$^{-3}$, $x_p$=5.8 nm (nanometer), $x_n$=11.6 nm, $t_p$=7 nm, and $t_n$=14 nm.

The length of the traveling waveguide structure of an electroabsorption modulator typically is determined by the need to achieve a specified optical extinction ratio for a specified voltage swing. The reduced optical losses achieved by optimizing the thicknesses of the n- and p-type layers 34, 36 allows the length of the traveling waveguide structure to be increased for achieving proper signal extinction. In this way, the use of such an optimized tunnel junction structure reduces the traveling waveguide length design constraint. As explained above, the thickness of the active region may be varied to achieve velocity matching.

Figure 6:
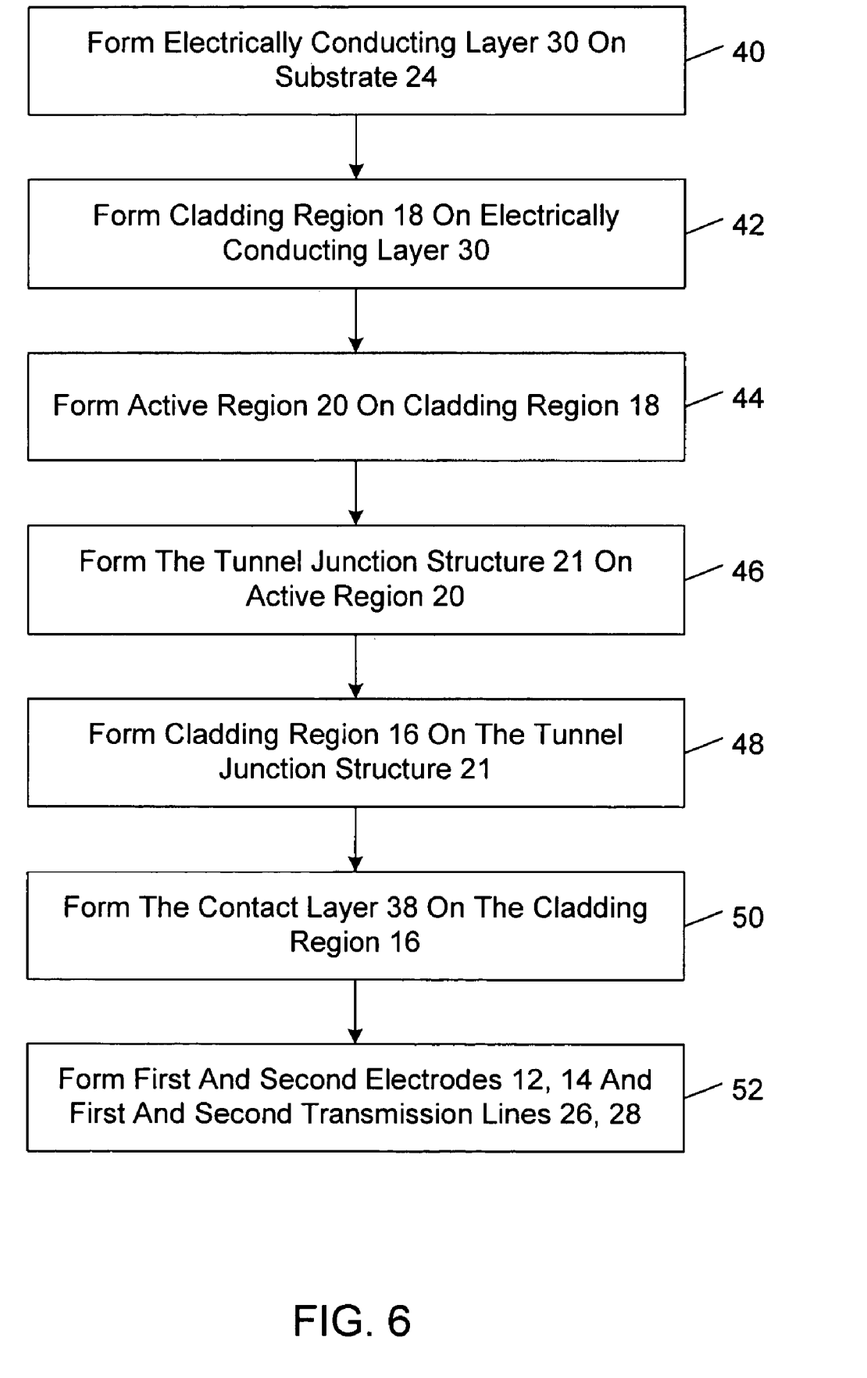
FIG. 6 is a flow diagram of an embodiment of a method of making the electroabsorption modulator embodiment of FIG. 1.

FIG. 6 shows an embodiment of a method of making the electroabsorption modulator 10. In accordance with this method, the electrically conducting layer 30 is formed on substrate 24 (block 40). The cladding region 18 is formed on the electrically conducting layer 30 (block 42). The active region 20 is formed on the cladding region 18 (block 44). The tunnel junction structure 21 is formed on the active region 20 (block 46). The cladding region 16 is formed on the tunnel junction structure 21 (block 48). The contact layer 38 is formed on the cladding region 16 (block 50). The first and second electrodes 12, 14 are formed on the contact layer 38 and the backside of the substrate, and the first and second transmission lines 26, 28 are formed on the electrically conducting layer 30 (block 52).

Other embodiments are within the scope of the claims.

For example, the electroabsorption modulator embodiments are described above in connection with a ridge-type waveguide structure. In other embodiments, however, the electroabsorption modulators may by incorporated in different types of waveguide structures. For example, in some embodiments, the electroabsorption modulators are formed from a buried heterostructure.

What is claimed is:

1. An electroabsorption modulator, comprising:
   first and second electrodes;
   first and second cladding regions between the first and second electrodes;

an active region between the first and second cladding regions and including a light absorption region located between an upper portion and a lower portion of the active region; and a tunnel junction structure between the active region and one of the first and second cladding regions comprising an n-type semiconductor layer and a p-type semiconductor layer, wherein the n-type semiconductor layer and the p-type semiconductor layer are characterized by respective depletion layer thicknesses $x_n$ and $x_p$ in thermal equilibrium, the n-type semiconductor layer has a thickness $t_n$ of at least about $0.9 \cdot x_n$ and less than about $2.0 \cdot x_n$, and the p-type semiconductor layer has a thickness $t_p$ of at least about $0.9 \cdot x_p$ and less than about $2.0 \cdot x_p$.

2. The electroabsorption modulator of claim 1, wherein $x_n \leq t_n \leq 1.1 \cdot x_n$ and $x_p \leq t_p \leq 1.1 \cdot x_p$.

* * * * *